United States Patent
Bates et al.

(10) Patent No.: US 7,080,360 B2
(45) Date of Patent: *Jul. 18, 2006

(54) BREAKPOINT SAFETY NET

(75) Inventors: Cary Lee Bates, Rochester, MN (US);
Steven Gene Halverson, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 678 days.

This patent is subject to a terminal disclaimer.

(21) Appl. No.: 10/017,959

(22) Filed: Dec. 14, 2001

(65) Prior Publication Data

US 2003/0115576 A1 Jun. 19, 2003

(51) Int. Cl.
*G06F 9/44* (2006.01)

(52) U.S. Cl. .................. 717/129; 717/127; 717/124; 717/126; 717/128; 717/125

(58) Field of Classification Search .............. 717/129, 717/4, 124
See application file for complete search history.

(56) References Cited

U.S. PATENT DOCUMENTS

| | | | |
|---|---|---|---|
| 6,516,460 B1 * | 2/2003 | Merks et al. ............... | 717/124 |
| 6,681,384 B1 * | 1/2004 | Bates et al. ................ | 717/129 |
| 6,842,893 B1 * | 1/2005 | Sangavarapu et al. ...... | 717/129 |
| 6,848,097 B1 * | 1/2005 | Alverson et al. ........... | 717/124 |
| 2001/0004766 A1 * | 6/2001 | Koyama ..................... | 717/4 |
| 2002/0073401 A1 * | 6/2002 | Sangavarapu et al. ...... | 717/129 |
| 2002/0073402 A1 * | 6/2002 | Sangavarapu et al. ...... | 717/129 |
| 2003/0005415 A1 * | 1/2003 | Bates et al. ................ | 717/129 |
| 2003/0061599 A1 * | 3/2003 | Bates et al. ................ | 717/129 |
| 2003/0066054 A1 * | 4/2003 | Aarts et al. ................ | 717/129 |
| 2003/0106045 A1 * | 6/2003 | Arnold et al. .............. | 717/129 |
| 2003/0106046 A1 * | 6/2003 | Arnold et al. .............. | 717/129 |
| 2004/0205720 A1 * | 10/2004 | Hundt ........................ | 717/124 |

OTHER PUBLICATIONS

Ramsey, Correctness of Trap-based Breakpoint Implementations, ACM, 1994.*

* cited by examiner

*Primary Examiner*—Kakali Chaki
*Assistant Examiner*—Insun Kang
(74) *Attorney, Agent, or Firm*—Patterson & Sheridan, LLP (57) ABSTRACT

Method, apparatus and article of manufacture for debugging code. One embodiment provides a method of debugging code containing a user-specified breakpoint located within a region of the code. The method comprises executing the code, determining whether the execution of the code exits the region of the code without firing the user-specified breakpoint, and if so, halting the execution of the code.

28 Claims, 10 Drawing Sheets

Fig. 1
PRIOR ART

| | 202 | 204 | 206 | 208 | 210 | 212 | 214 |
|---|---|---|---|---|---|---|---|
| | ADDRESS | LINE | OP CODE | TYPE | CONDITION | SAFETY NET LIST | PARENT BP |
| 1. | 0E76890A | 236 | EQU | NORMAL | ww == 197 | 2 | |
| 2. | 0E76899E | 240 | CALL | SAFETY NET | | | |
| 3. | 0E7677654 | 228 | CALL | SAFETY ENTRY | | 2 | 1 |
| | | | | ... | | | |

| NESTING DATA | | |
|---|---|---|
| 302 | 304 | 306 |
| NEST RANGE | ENTRY POSITIONS | EXIT POSITIONS |
| 234, 237 | 233 | 238 |
| 229, 239 | 228 | 240 |
| 225, 241 | 224 | 242 |
| ⋮ | ⋮ | ⋮ |

```
224
225    for ( i = 1; i < 100; i++ )
226    {
227        k = i;
228        foo(&k);
229        for ( j = 2; j < 200; j++ )
230        {
231            l = foo22( j + k );
232            ww = 1 / 22;
233            if ( ww == 199 )
234            while( str[ww] l = 0 )
235            {
236                str[ww] = string_upper(str[ww++]);
237            }
238            foo3(ww);
239        }
240        foo(ww);
241    }
242
```

```
test*
File  View  Projet  Debug  Breakpoint  Tools  Window  Hide com.ibm.as
Imports
McgYrmList 224  }
225  for ( i = 1; i < 100; i++ )
226  {
227    k = i;
228    foo(&k);
229    for ( j = 2; j < 200;
230    {
231      l = foo22( j + k
232      ww = 1 / 22;
233      if ( ww == 199  )
234      while( str[ww] =
235      {
236        str[ww] = str
237      }
238      foo3(ww);
239    }
240    foo(ww);
241  }
242  {

Line 245

Solution:
ww == 197
SAFETY   OK   CANCEL

Recent Files
```

```
224  }
225  for ( i = 1; i < 100; i++ )
226  {
227      k = i;
228      foo(&k);
229      for ( j = 2; j < 200;
230      {
231          l = foo22( j + k
232          ww = 1 / 22;
233          if ( ww == 199 )
234          while( str[ww] =
235          {
236              str[ww] = str
237          }
238          foo3(ww);
239      }
240      foo(ww);
241  }
242  {
```

Solution:

ww == 197

SAFETY    OK    CANCEL

Line 245 com.ibm.as
Imports
McgYrmList

Recent Files test*

```
224  }
225  for ( i = 1; i < 100; i++ )
226  {
227      k = i;
228      foo(&k);
229      for ( j = 2; j < 200;
230      {
231          l = foo22( j + k
232          ww = 1 / 22;
233          if ( ww == 199 )
234          while( str[ww] =
235          {
236                  str[ww] = str
237          }
238          foo3(ww);
239      }
240      foo(ww);
241  }
242  {
```

Line 245

Solution:
ww == 197

SAFETY  OK  CANCEL

Fig. 9

```
224  }
225  for ( i = 1; i < 100; i++ )
226  {
227      k = i;
228      foo(&k);
229      for ( j = 2; j < 200; j++ )
230      {
231          l = foo22( j + k )
232          ww = 1 / 22;
233          if ( ww == 199 )
234          while( str[ww] =
235                 str[ww] = str
236          {
237          }
238          foo3(ww);
239      }
240      foo(ww);
241  }
242  }
```

Solution:

ww == 197

SAFETY    OK    CANCEL

Line 245

Fig. 10

BREAKPOINT SAFETY NET

BACKGROUND OF THE INVENTION

1. Field of the Invention

The present invention generally relates to data processing. More particularly, the invention relates to debugging.

2. Description of the Related Art

A programmer develops a software program by producing and entering source code into files using a text editor program. The computer then creates an executable program by translating the source code listing into machine code. The machine code is the rudimentary language understood by a computer. Illustratively, the foregoing software development process is accomplished by running a series of programs. These programs typically include a compiler for translating the source code into machine code and a linker to link the machine code together to form a program.

When developing computer software, it is necessary to perform a function termed "debugging". Debugging involves testing and evaluating the software to find and correct any errors and improper logic operation. An effective debugger program is necessary for rapid and efficient development of software.

A conventional debugging system comprises a combination of computer hardware and debugger software that executes a user's program in a controlled manner. Debugging aids a user in identifying and correcting mistakes in an authored program by allowing the program to be executed in small segments. This approach is enabled primarily by two operations: step functions and breakpoints.

A "step" function permits a computer programmer to process instructions (also known as "statements") in a computer program one-by-one, and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, conventional debuggers utilize a breakpoint operation, which permits a computer programmer to identify, with a "breakpoint", a precise instruction for which it is desired to halt execution of a computer program during execution. As a result, when a computer program is executed by a debugger, the program executes in a normal fashion until a breakpoint is reached, and then stops execution and displays the results of the computer program to the programmer for analysis.

Some conventional debuggers support unconditional breakpoints where the execution of the program is always halted upon reaching the breakpoint. Other debuggers support conditional breakpoints that halt the execution of a program only when a predetermined value is obtained when the breakpoint is encountered.

By definition, conditional breakpoints only halt the execution of a program when the conditional breakpoint's respective condition is satisfied. If the condition is not satisfied when the breakpoint is encountered, execution continues. Execution may continue during the entire run of the code. This result is typically undesirable to programmers because the programmer expects the breakpoint to fire at some point. As result, when a conditional breakpoint fails to fire, the programmer is left in the position of having to set up and re-run the program, which can be time-consuming and frustrating.

While conditional breakpoints present particular difficulties with respect to effective and efficient debugging, such difficulties also arise with non-conditional breakpoints. Source code is replete with instances of conditions giving rise to nonpredictable and varying execution paths. As a result, non-conditional breakpoints will often not be encountered during execution of the program, even though the programmer set these breakpoints with the expectation that they would be encountered.

In an effort to exert a greater degree of control over the debugging environment, programmers must spend additional time and effort to take precautionary steps. For example, when setting conditional breakpoints in a loop programmers often scan the program source code looking for the end of the loop in order to set a non-conditional breakpoint immediately thereafter. The non conditional breakpoint acts as a "safety net" which will stop execution in the event that the conditional breakpoint does not. While effective, this approach is time-consuming and increases the cost of debugging.

Therefore, there is a need for a system and method for achieving greater control and certainty over conditional situations in a debugging environment.

SUMMARY OF THE INVENTION

The present invention generally provides methods, apparatus and articles of manufacture for debugging code. One embodiment provides a method of debugging code containing a user-specified breakpoint located within a region of the code. The method comprises executing the code, determining whether the execution of the code exits the region of the code without firing the user-specified breakpoint, and if so, halting the execution of the code.

In another embodiment, an article of manufacture, such as a computer readable medium, contains a program which, when executed performs the foregoing method.

In still another embodiment, a computer system comprises a processor and a memory containing a debug program and code containing a user-specified breakpoint located within a region of the code. When executing the contents of the memory, the processor is configured to perform the foregoing method.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally provides methods, apparatus and articles of manufacture for debugging code. One embodiment provides a method of debugging code containing a user-specified breakpoint located within a region of the code. The method comprises executing the code, determining whether the execution of the code exits the region of the code without firing the user-specified breakpoint, and if so, halting the execution of the code.

One embodiment of the invention is implemented as a program product for use with a computer system such as, for example, the computing environment shown in FIG. 1 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
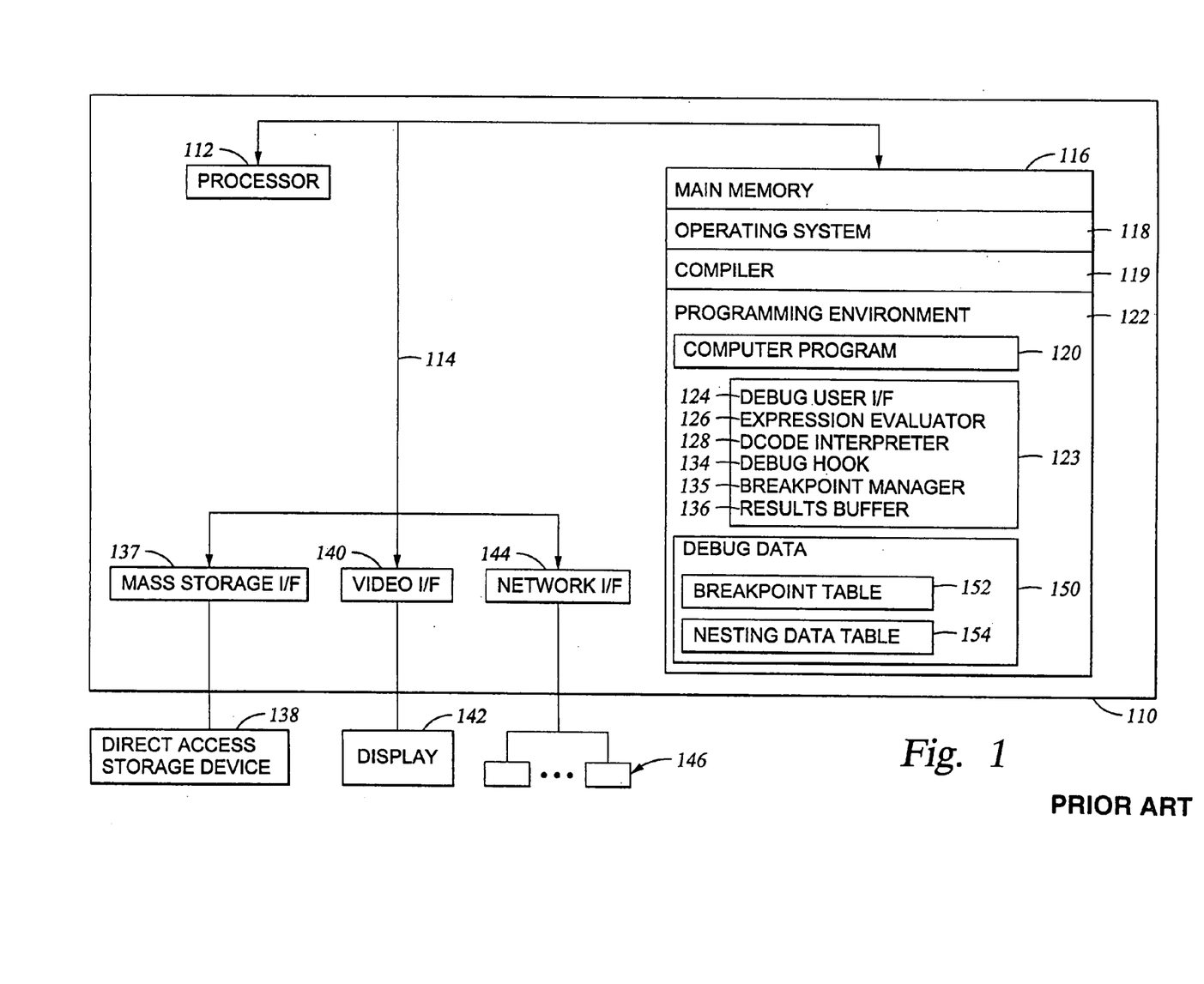
FIG. 1 is a high-level diagram of a computer configured for debugging.

Referring now to FIG. 1, a computer system 110 consistent with the invention is shown. Computer system 110 may represent any type of computer, computer system or other programmable electronic device, including a client computer, a server computer, a portable computer, an embedded controller, etc. The computer system 110 may be a standalone device or networked into a larger system. Moreover, those skilled in the art will appreciate that embodiments may be practiced with other computer system configurations including hand-held devices, multiprocessor systems, microprocessor-based or programmable consumer electronics, minicomputers, mainframe computers and the like. The embodiment may also be practiced in distributed computing environments where tasks are performed by remote processing devices that are linked through a communications network. In a distributed computing environment, program modules may be located in both local and remote memory storage devices. In one embodiment, the computer system 110 is an eServer iSeries computer available from International Business Machines Corporation of Armonk, N.Y.

The computer system 110 could include a number of operators and peripheral systems as shown, for example, by a mass storage interface 137 operably connected to a direct access storage device 138, by a video interface 140 operably connected to a display 142, and by a network interface 144 operably connected to a plurality of networked devices 146. The display 142 may be any video output device for outputting a user interface. The networked devices 146 could be desktop or PC-based computers, workstations, network terminals, or other networked computer systems.

Computer system 110 is shown comprising at least one processor 112, which obtains instructions, or operation codes, (also known as opcodes), and data via a bus 114 from a main memory 116. The processor 112 could be any processor adapted to support the debugging methods, apparatus and article of manufacture of the invention. In particular, the computer processor 112 is selected to support the debugging features of the present invention. Illustratively, the processor is a PowerPC available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device or on another computer coupled to the computer system 110 via bus 114.

As shown, the main memory 116 generally includes an operating system 118, a compiler 119 and a programming environment 122. The programming environment 122 comprises a computer program 120 to be debugged, a debugger program 123 and debug data 150. In one embodiment, the debug data 150 includes a breakpoint table 152 and a nesting data table 154. Embodiments of the breakpoint table 152 and the nesting data table 154 are described below.

The programming environment 122 facilitates debugging the computer program 120, or computer code, by providing tools for locating, analyzing and correcting faults. One such tool is the debugger program 123 (also referred to herein as the debugger). In one embodiment, the debugger 123 is a VisualAge for C++ for OS/400 debugger modified according to the invention. VisualAge for C++ for OS/400 is available from International Business Machines Corporation of Armonk, N.Y.

Although the software constructs, such as the computer program 120 and the debugger 123, are shown residing on the same computer, a distributed environment is also contemplated. Thus, for example, the debugger 123 and the debug data 150 may be located on a networked device 146, while the computer program 120 to be debugged is on the computer system 110.

In a specific embodiment, the debugger 123 comprises a debugger user interface 124, expression evaluator 126, Dcode interpreter 128 (also referred to herein as the debug interpreter 128), debugger hook (also known as a stop handler) 134, a breakpoint manager 135 and a results buffer 136. Although treated herein as integral parts of the debugger 123, one or more of the foregoing components may exist separately in the computer system 110. Further, the debugger may include additional components not shown.

A debugging process is initiated by the debug user interface 124. The user interface 124 presents the program under debugging and highlights the current line of the program on which a stop or error occurs. The user interface 124 allows the user to set control points (e.g., breakpoints and watch points), display and change variable values, and activate other inventive features described herein by inputting the appropriate commands. In some instances, the user may define the commands by referring to high-order language (HOL) references such as line or statement numbers or software object references such as a program or module name, from which the physical memory address may be cross referenced.

The expression evaluator 126 parses the debugger command passed from the user interface 124 and uses a data structure (e.g., a table) generated by a compiler to map the line number in the debugger command to the physical memory address in memory 116. In addition, the expression evaluator 126 generates a Dcode program for the command. The Dcode program is machine executable language that emulates the commands. Some embodiments of the invention include Dcodes which, when executed, activate control features described in more detail below.

The Dcode generated by the expression evaluator 126 is executed by the Dcode interpreter 128. The interpreter 128 handles expressions and Dcode instructions to perform various debugging steps. Results from Dcode interpreter 128 are returned to the user interface 124 through the expression evaluator 126. In addition, the Dcode interpreter 128 passes on information to the debug hook 134, which takes steps described below.

After the commands are entered, the user provides an input that resumes execution of the program 120. During execution, control is returned to the debugger 123 via the debug hook 134. The debug hook 134 is a code segment that returns control to the appropriate user interface. In some implementations, execution of the program eventually results in an event causing a trap to fire (e.g., a breakpoint or watchpoint is encountered). Control is then returned to the debugger by the debug hook 134 and program execution is halted. The debug hook 134 then invokes the debug user interface 124 and may pass the results to the user interface 124. Alternatively, the results may be passed to the results buffer 136 to cache data for the user interface 124. In other embodiments, the user may input a command while the program is stopped, causing the debugger to run a desired debugging routine. Result values are then provided to the user via the user interface 124.

Figure 2:
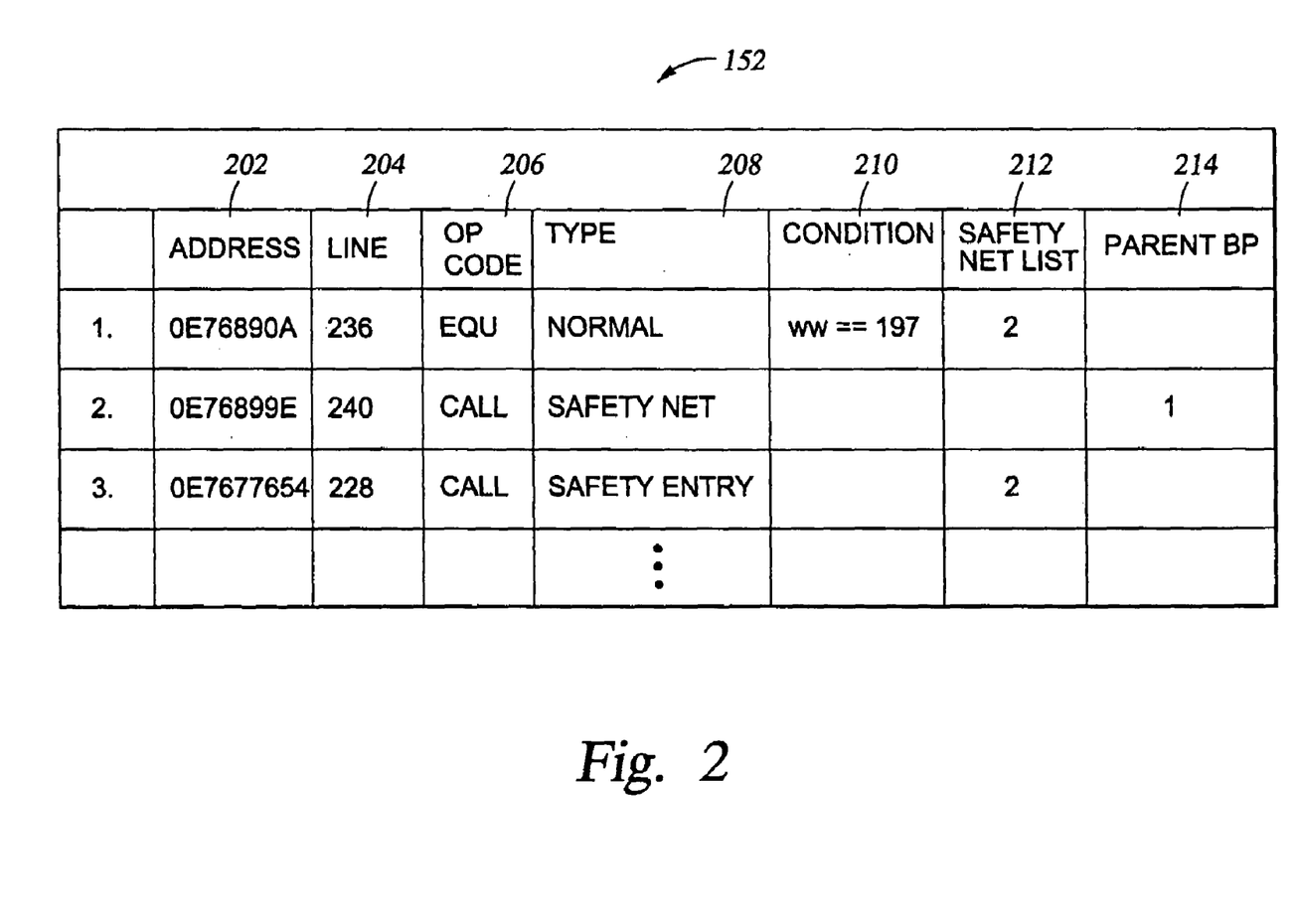
FIG. 2 is a representation of one embodiment of a breakpoint table.

FIG. 2 shows one embodiment of the breakpoint table 152. In general, the breakpoint table 152 provides some aspects which are well-known in the art in combination with some inventive features. For example, as is well-known, an address column 202, a line number column 204 and an opcode (operation code) column 206 are shown. The information contained under the address column 202 specifies a memory location of a breakpoint. The information contained under the line number column 204 specifies a line number in the computer program 120 at which the breakpoint is located. The information contained under the opcode column 206 specifies the original operation code of the program which has been replaced with some "bad" operation code to cause an interrupt and make the break occur in the code.

The breakpoint table 152 is further configured with a type column 208, a condition column 210, a safety net list column 212, and a parent breakpoint list column 214. The entries of the type column 208 specify the type of breakpoint for a given record of the breakpoint table 152. In one embodiment, illustrative types include "normal", "safety net" and "safety entry". A "normal" breakpoint is a conventional user-specified breakpoint which, upon being encountered, calls the user interface 124. A normal breakpoint may also have an associated condition specified in the condition column 210. If a condition is specified, the breakpoint may be referred to herein as a "conditional breakpoint" in which case the user interface 124 is only called if the condition is satisfied upon encountering the breakpoint. A "safety net" breakpoint is also a conventional breakpoint which is located relative to an exit point of a particular scope/nest of the code being debugged. However, unlike "normal" breakpoints, "safety net" breakpoints are not user-specified. Instead, safety net breakpoints are automatically set for a user-specified scope/nest. In addition, "safety entry" breakpoints are also automatically set relative to an entry point for each user-specified scope/nest. However, safety entry breakpoints are merely used to determine when a scope/nest has been entered and do not call the user interface 124, so that safety nets can be reestablished. Accordingly, safety entry breakpoints may be referred to as "internal breakpoints". The scope/nest range, entry point, and exit point are specified in the nesting data table 254, an embodiment of which will be described below with reference to FIG. 3.

The entries of the safety net column 212 contain an index number which, for normal breakpoints and safety entry breakpoints, reference an associated safety net breakpoint. The entries of the parent breakpoint column 412 contain an index number which, for safety net breakpoints, reference the associated normal breakpoint.

Figure 3:
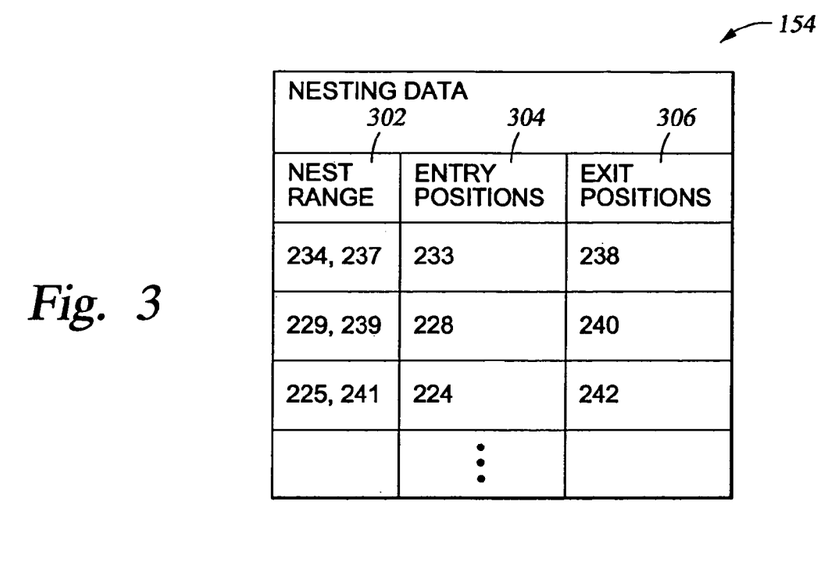
FIG. 3 is a representation of one embodiment of a nesting data data structure.

FIG. 3 shows one embodiment of the nesting data table 154. In one embodiment, the nesting data table 154 is generated by the compiler 119 and is generally configured as a plurality of columns and rows, where each row defines a record. Specifically, the nesting data table 154 comprises a nest range column 302, an entry position column 304, and an exit position column 306. The nest range column 302 specifies the range of a nest/scope of the computer program source code. The entry position column 304 and exit position column 306 contain the line numbers on which a nest/scope begins and ends, respectively. As used herein, "nest" and "scope" refer to a software language construct (of the source code for the computer program 120) having at least one entry point and at least one exit point. For example, a while loop defines a nest/scope. Illustrative definitions for the terms "nest", "scope", "entry points", "exit points" are provided by way of illustration with reference to FIG. 4.

Figure 4:
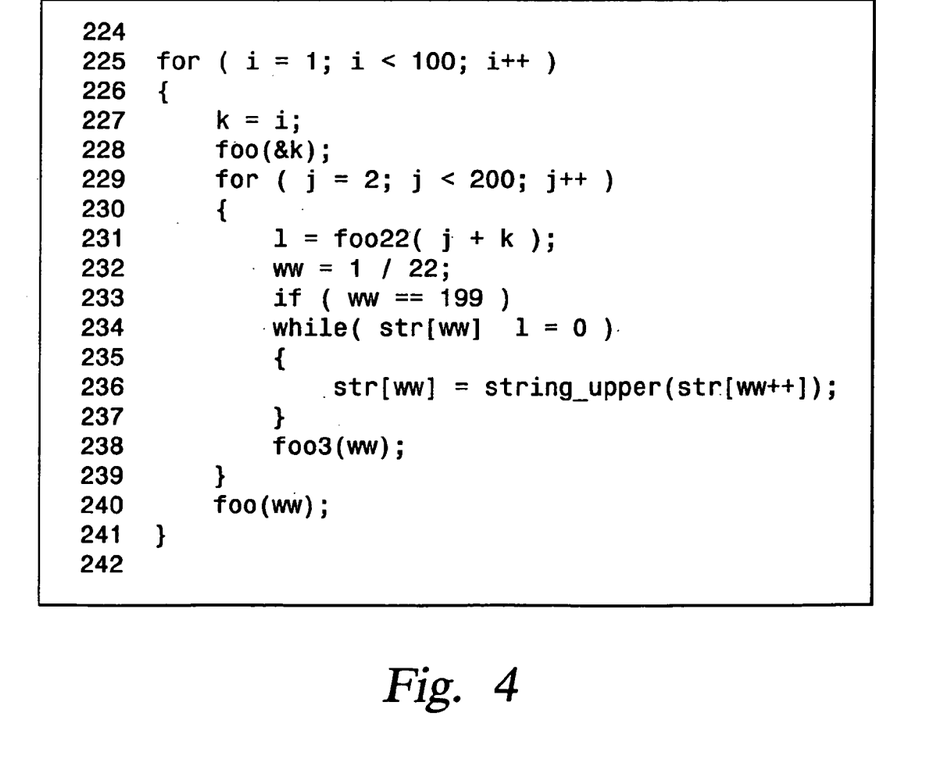
FIG. 4 is sample code illustrating nesting levels.

Referring now to FIG. 4, illustrative source code for the computer program 120 is shown. In this example, three nests/scopes are shown. An innermost nest is defined by the while loop beginning and line 234. Moving progressively outwardly, the next innermost loop is a for loop beginning at line 229. Finally, the outermost loop is a for loop beginning at line 225. Each of the illustrative nests has associated entry points and exit points. The entry points and exit points are determined by the compiler 119. Accordingly, the positions of the entry points and exit points will depend upon the manner in which the compiler 119 is implemented.

The nesting data table 154 shown in FIG. 3 contains illustrative values generated by the compiler 119 for each of the nests shown in FIG. 4.

As noted, the nesting data contained in the nesting data table 154 is generated by the compiler 119. Nesting data is generated by the compiler. Nesting regions will vary between compiler languages and can even vary between compilers of the same languages as different techniques may be employed. In general, the primary language construct that a compiler is likely to insert a nesting region for is a loop. Several common loop types exist in various computer languages. These include, for example, "for" loops, a top driven or "while" loop, and a bottom driven or "repeat" loop. Regardless of the loop type, the compiler generates the nesting region such that the entry position refers, to a statement that is just outside the loop so that if the loop is entered this statement will be executed. The exit position should be a statement just outside the loop, so that whenever execution exits the loop it must go through the exit point. The nest range would cover only those statements that are repeatedly executed by the loop.

Most compilers are written using compiler generators. One of the most common of these is YACC (Yet Another Compiler Compiler), which originated with the UNIX operating system. Most of these compiler generators accept an input language which represents the language grammar. One such production could have the following format: WHILE (condition) body. Each of the grammar rules or productions is then augmented with code that is used to access and build symbol tables, generate machine code, and even generate debug data. One simple strategy a compiler may use to generate nesting data is to add code to the language productions that define language structures such as loop. This code would first generate what is known as an NOOP statement, and store its position as the entry position for the loop. Code added just before the body of the loop would determine the start of the nest range and code right after the body would determine the end of the range. Additional code is added after the body to generate another NOOP, which is stored as the exit position.

While these NOOPS are not always necessary, there are times when the instructions immediately proceeding the loop may not flow into the loop but branch around the loop. Consider the following example shown in Table I.

TABLE I

```
001 if (x > 3)
002    y = 2;
003 else
004 {
005 do {
006    k++;
007    } while( a[k]!= 0);
008 }
```

In the case of the loop at lines 5–7, the first hardware instruction before the loop would be a branch around the loop. Inserting the NOOP instruct just before the loop and after the branch around the loop provides a location to set the entry breakpoint.

Those skilled in the art will appreciate that with further analysis, compilers can determine if a NOOP is actually necessary and only insert one in conditions like those described above.

Figure 5A:
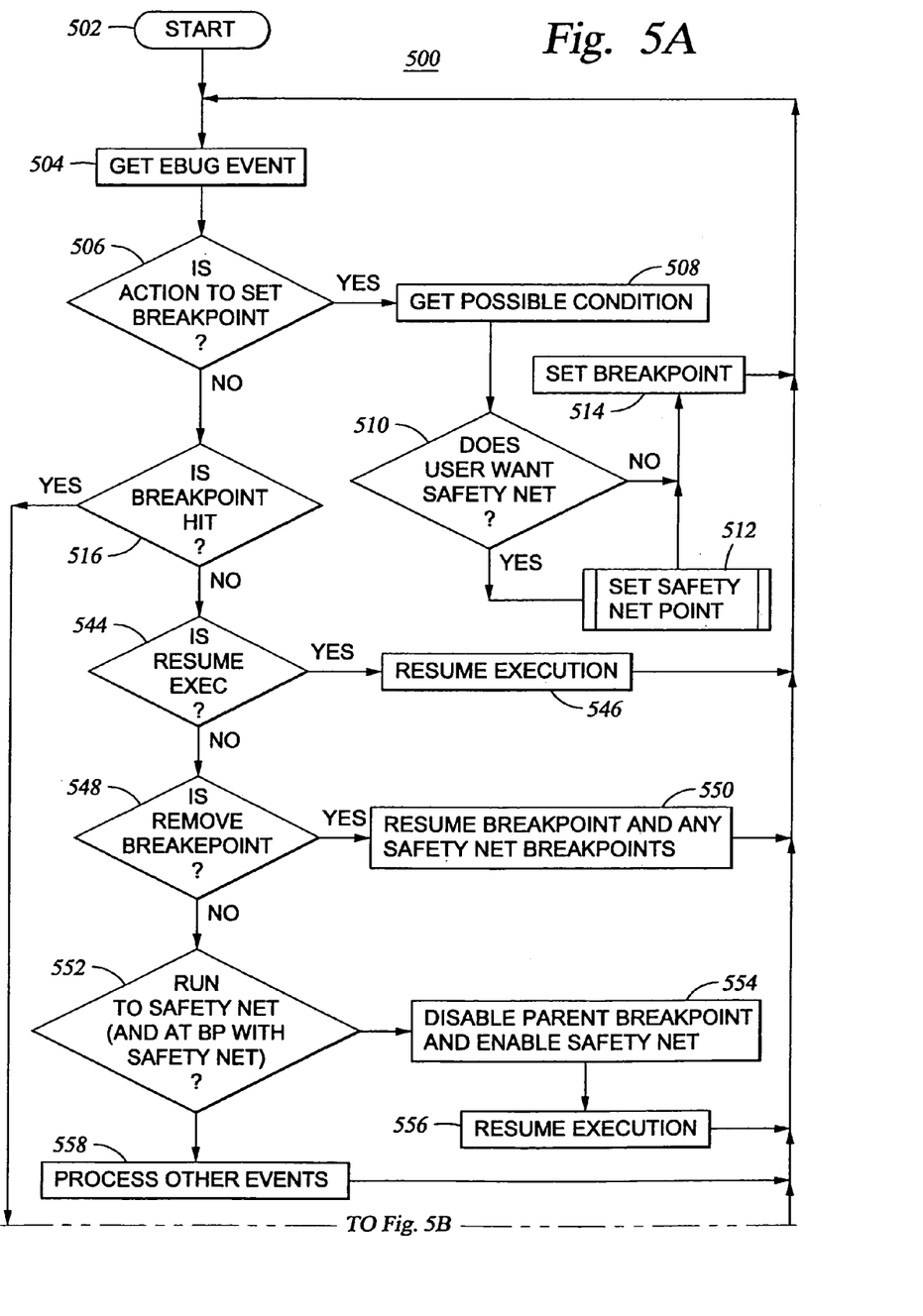
FIG. 5 is a flowchart illustrating the operation of a debugger.
Figure 5B:
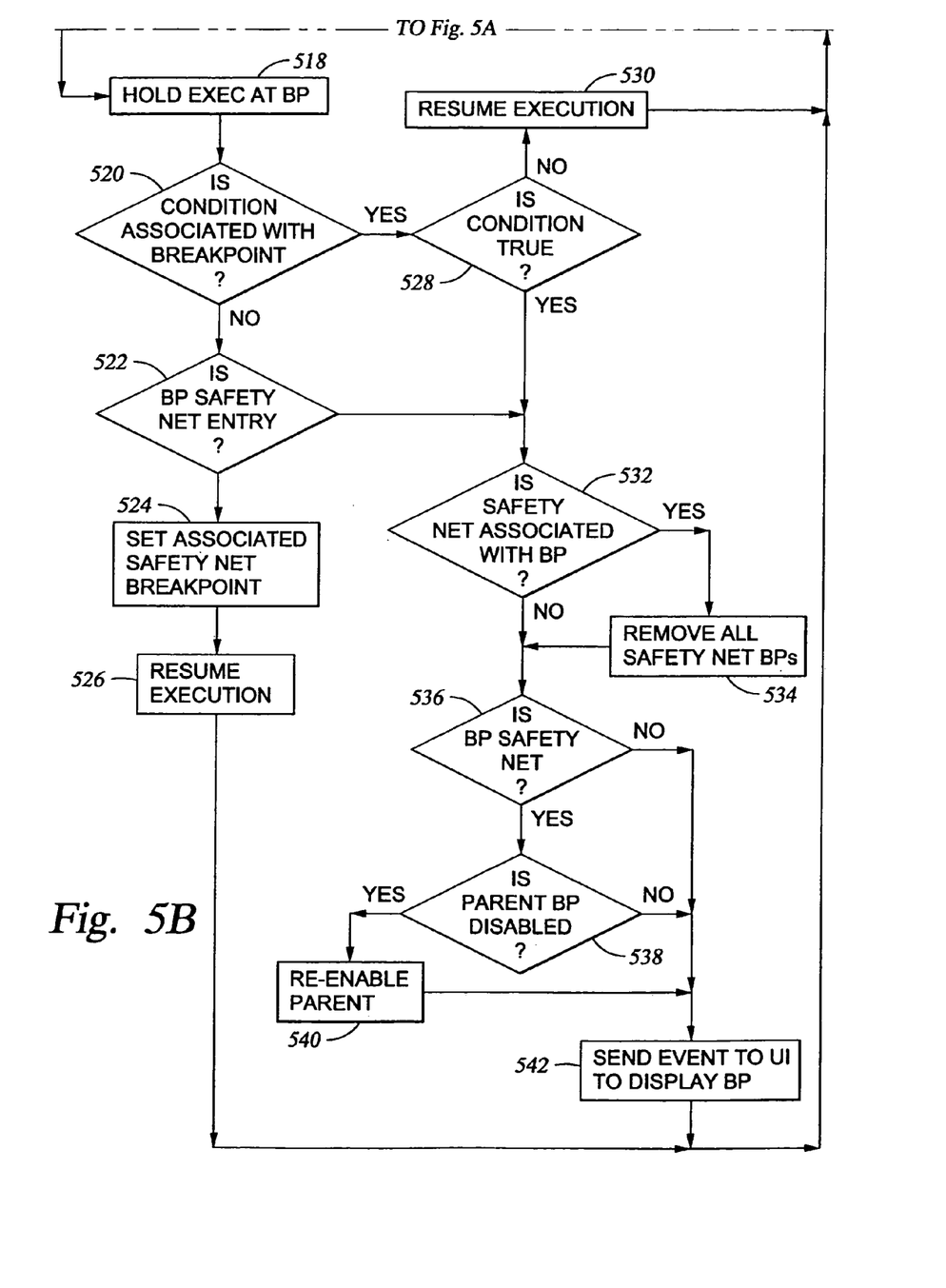

Referring out to FIG. 5, a method 500 shown illustrating the operation of the debug program 123. The method 500 is entered at step 502 and proceeds to step 504 where a debugged event is received for processing. At step 506, the method 500 queries whether the event is to set a normal breakpoint. If so, processing proceeds to step 508 where any user-specified condition is written to the condition column 210 of the breakpoint table 152. At step 510, the method queries whether the user has indicated a desire to associate a safety net with the normal breakpoint being set. If so, the safety net is established at step 512 (i.e., a safety entry breakpoint and a safety exit breakpoint are set) and the normal breakpoint is then set at step 514. If step 510 is answered negatively, processing proceeds directly to step 514. In case, the method 500 and returns to step 504 to receive the next event.

Figure 6:
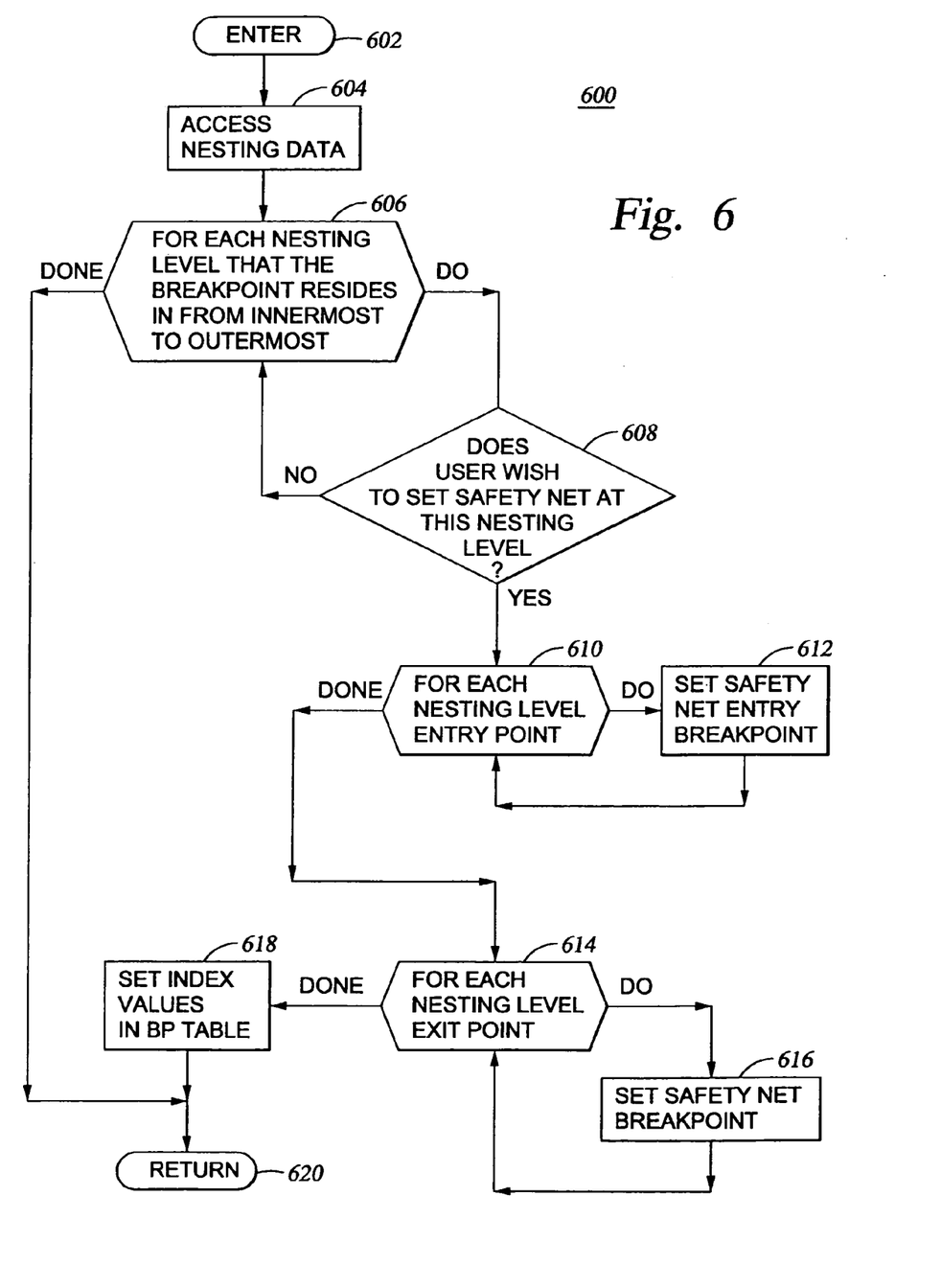
FIG. 6 is a flowchart illustrating the operation of the debugger when setting a safety net.

One embodiment of a method 600 for setting a safety net is described with reference to FIG. 6. The method 600 is entered at step 602 and proceeds to step 604 where the nesting data contained in the nesting data table 154 is accessed. At step 606, a loop is entered for each nesting level that the normal breakpoint being set resides in. At step 608, the method 600 queries whether the user desires to set a safety net for the currently selected nesting level. If not, processing returns to step 606 to select the next nesting level. Illustratively, the loop defined by steps 606 and 608 proceeds from the innermost nesting level to the outermost nesting level. However, in another embodiment a history file may be consulted to determine whether the user had previously set a normal breakpoint at the same location now being processed. If so, the loop entered at step 606 may begin with the nesting level previously selected by the user. If the user does not desire to set a safety net for the previously selected nesting level, then the loop defined by steps 606 and 608 may continue processing the remaining nesting levels from the innermost level to the outermost level, or in any other order.

Once the user selects a nesting level at step 608, a loop is entered at step 610 for each entry point of the selected nesting level. The loop entered at step 610 is provided because any given nesting level may have more than one entry points. Accordingly, at step 612, a safety net entry breakpoint is set and processing then returns to step 610 for the next nesting level entry point. Step 612 is repeated for each nesting level entry point after which processing proceeds to step 614.

At step 614, a loop is entered for each nesting level exit point of the selected nesting level. At step 616, the safety net breakpoint is set. Step 616 is repeated for each nesting level exit point, after which processing proceeds from step 614 to step 618. At step 618, the appropriate index values are written to the breakpoint table 152. Specifically, an index value referencing the safety net breakpoint record is written to the respective safety net list fields (in the safety net list column 212) of the normal breakpoint record and the safety entry breakpoint record. For example, the breakpoint table 152 shown in FIG. 2 shows the numeral '2' contained in the respective safety net list fields for the normal breakpoint (located in the first record) and the safety entry breakpoint (located in the third record). The numeral '2' refers to the second record of the breakpoint table 152, which contains the safety net breakpoint. Likewise, the safety net record (i.e., the second record) is configured with an index value independent breakpoint column 214 referencing the associated normal breakpoint.

Figure 7:
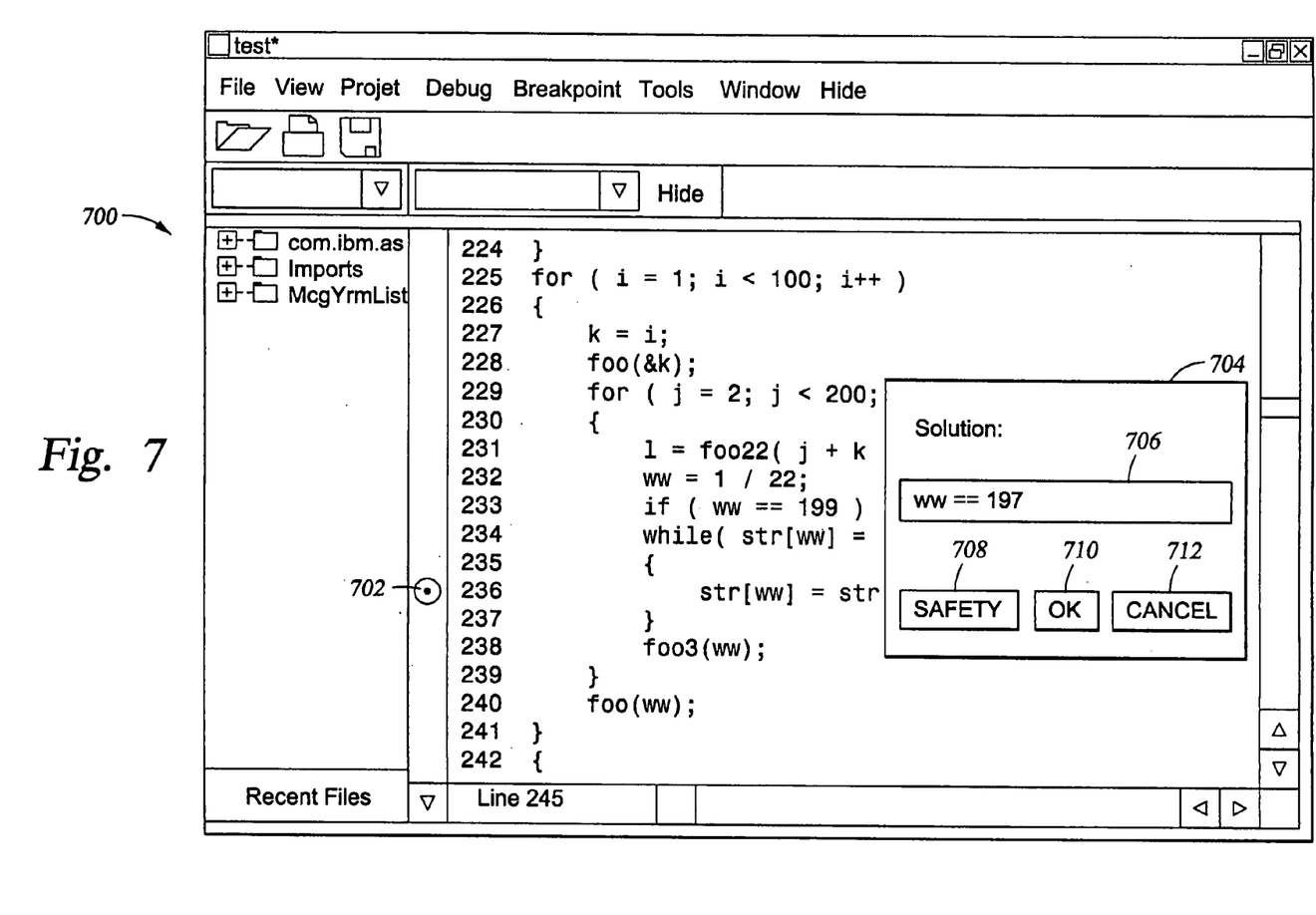
FIGS. 7–10 are representations of graphical user interfaces (GUIs) configured for establishing a safety net.

Selecting a nesting level for purposes of establishing a safety net according to method 600 may be further described with reference to FIGS. 7–10. Each of the FIGS. 7–10 shows a graphical user interface (GUI) 700 of the debug program 123. For simplicity, the GUI 700 shows only a single frame\window containing source code. However, as is known in the art, the GUI may be configured with multiple frames\windows including a variables window, a watch window, a call stack window, etc. Referring first to FIG. 7, the GUI is shown configured with a breakpoint indicator indicating where a user has set a normal breakpoint. If the user then desires to set a safety net, a safety net dialog box 704 may be called (e.g., by clicking on a safety net button). The safety net dialog box 704 is configured with a condition field 706, "safety" button 708, "OK" button 710 and "Cancel" button 712. If the user desires to set a conditional breakpoint, then a condition for the breakpoint is specified in the condition field 706. Illustratively, the user has specified "ww==197". In order to select a nesting range for the breakpoint the user presses the safety button 708.

Figure 8:
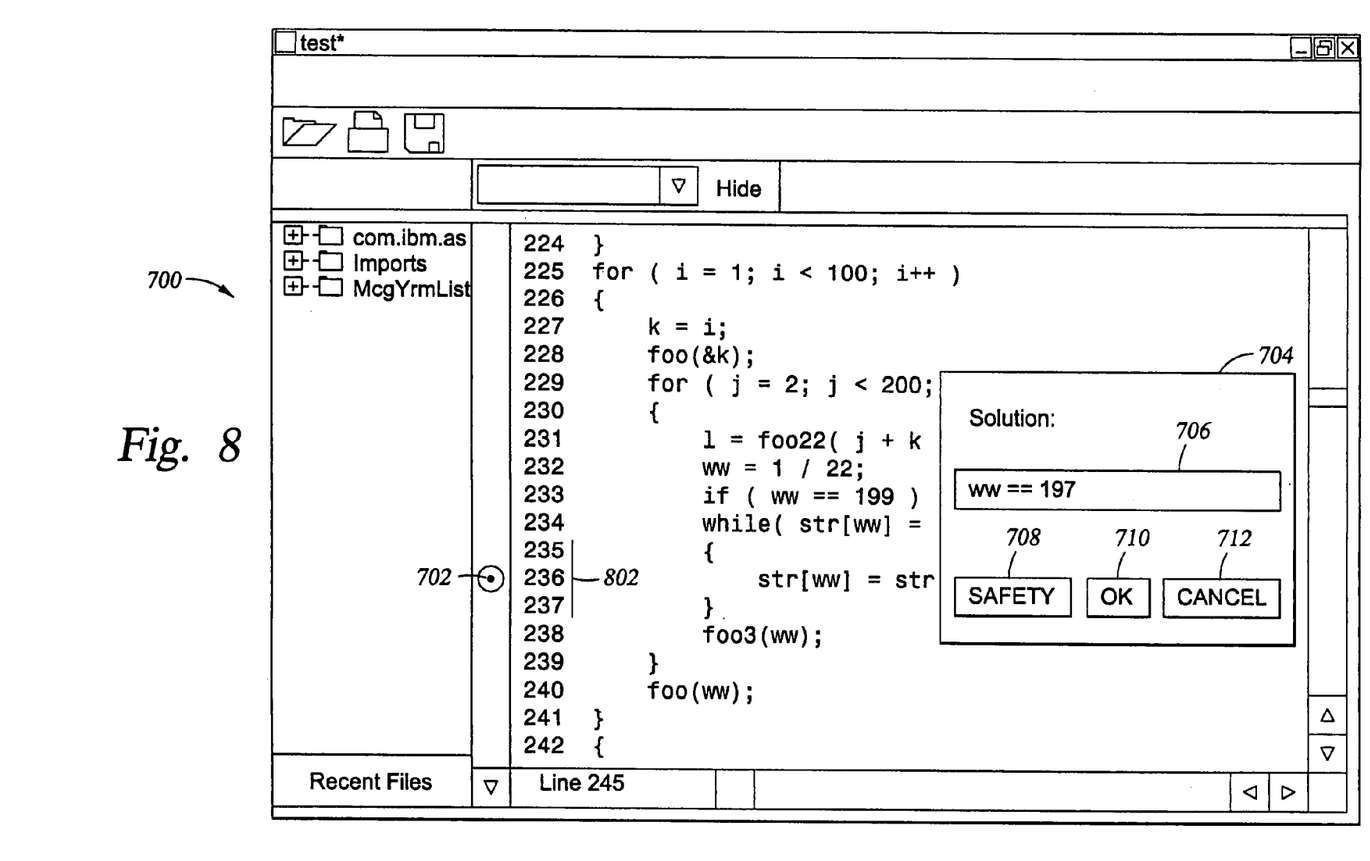
Figure 9:
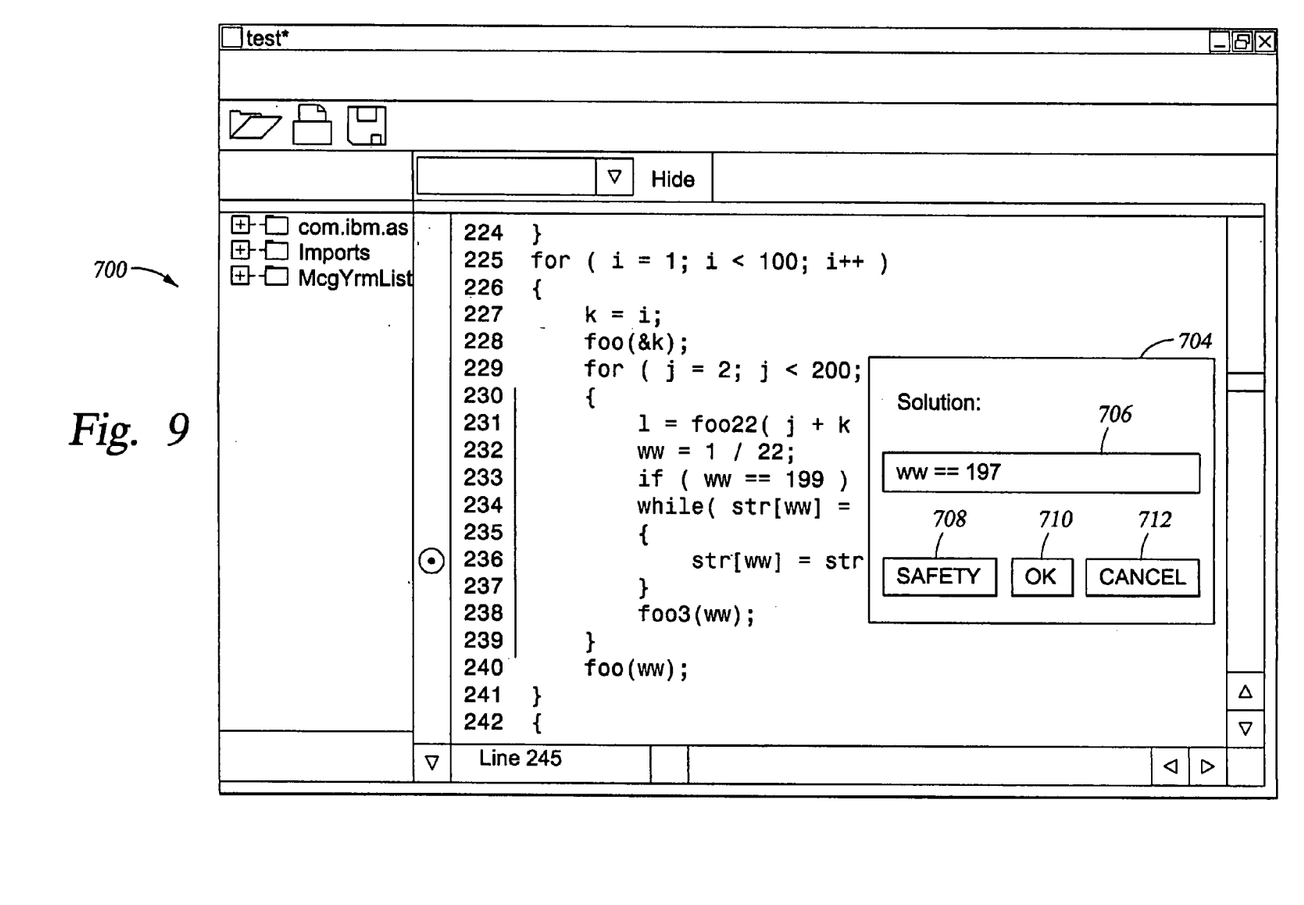
Figure 10:
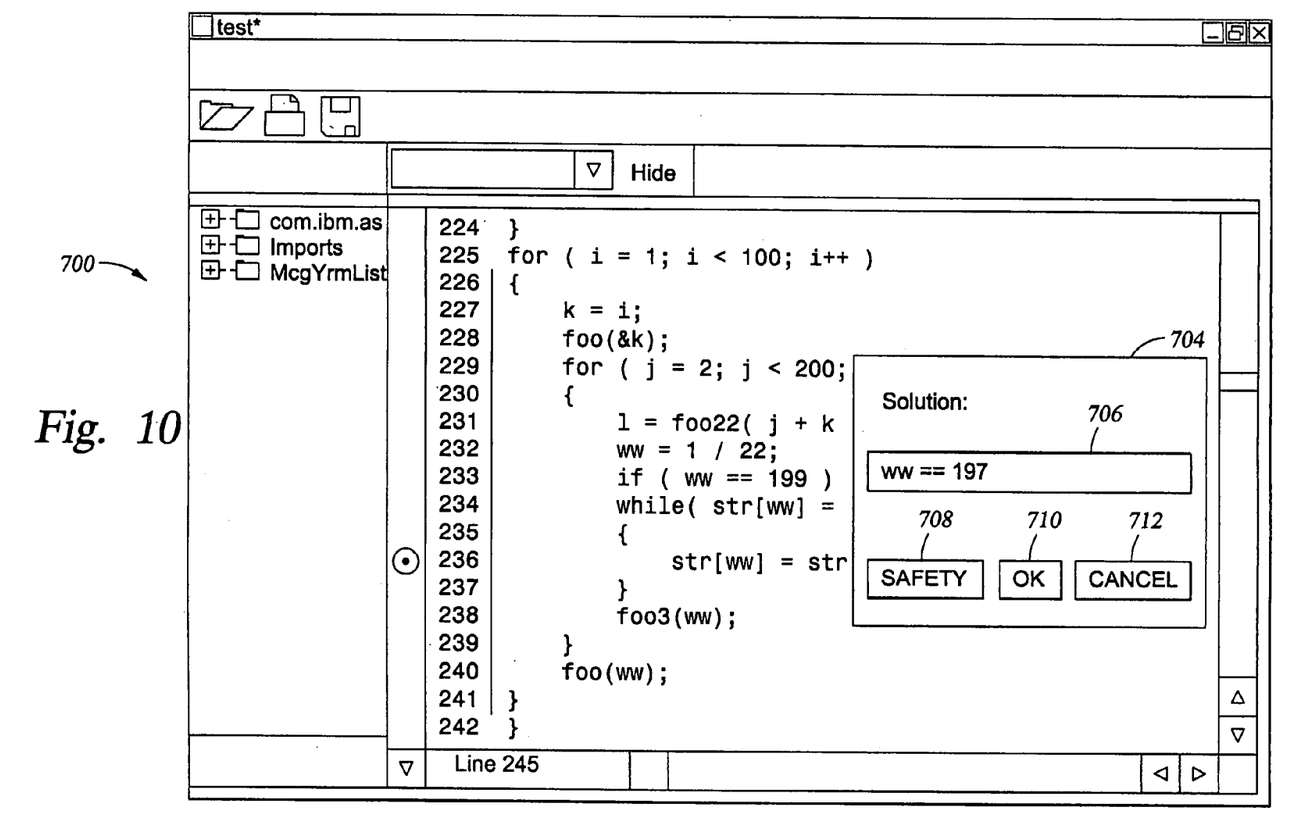

A representation of the GUI 700 after pressing the safety button 708 is shown in FIG. 8. The GUI 700 is now configured with a nesting range bar 802 at a left-hand side. The nesting range bar 802 is a graphical representation of the currently selected nesting range. In this case, the nesting range bar 802 indicates that only the innermost nesting level has been specified by the user. If the user presses the safety button 708 again, the nesting range bar 802 expands to include the next innermost nesting level, as shown in FIG. 9. If the user presses the safety button 708 yet again, the nesting range bar 802 expands to include the next innermost nesting level, as shown in FIG. 10. In the illustration shown in FIG. 10, the nesting range bar 802 now includes all nesting levels for the source code shown. For any given selected nesting level, the user may press the OK button 710 in order to set the safety net. That is, by pressing the OK button 710, the safety entry breakpoint and the safety exit breakpoint (also referred to herein as the safety net breakpoint) are set for the selected nesting level.

The embodiments described with reference to FIGS. 6–10 provide a method of selecting a nesting level at the time a normal breakpoint is set and prior to resuming execution of the computer program 120. In an alternative embodiment, a safety net may automatically be set on each of the nesting levels in which the normal breakpoint is contained. In such an embodiment, a user may set a normal breakpoint and then resume execution without first establishing a safety net. If the normal breakpoint does not fire, the user will hit, and can accept or reject, the safety net breakpoints one at a time. Rejecting a safety net breakpoint for a particular nesting level serves to remove the safety net breakpoint. Once one of the safety net breakpoints is accepted, the remaining safety net breakpoints associated with the normal breakpoint may be automatically removed. The accepted safety net breakpoint is now active for subsequent execution. In this manner, a user may postpone any decisions regarding which nesting level to set a safety net on. Further, if the normal breakpoint does fire, then no safety net was needed and the decision to set a safety net was completely avoided.

In the embodiments described with reference to FIGS. 6–10 each of the nesting levels is a loop. However, it should be understood that the code shown in the GUI 700 is merely illustrative and that embodiments of the invention are not limited to loops. More generally, the scope of the invention is inclusive of any conditional situation which may arise in code. For example, if statements and procedure bodies also provide conditional situations in which embodiments of the invention may be used to advantage.

Reference is now made back to FIG. 5 for discussion of the remaining processing. If the debug event received at step 504 is not to set a normal breakpoint, then processing proceeds to step 516 where the method 500 queries whether a breakpoint has been encountered. If a breakpoint has been encountered, execution is suspended, as indicated by step 518. Processing then proceeds to step 520.

At step 520, the method 500 queries whether a condition is associated with the breakpoint (i.e., whether the breakpoint encountered is a conditional breakpoint). If not, processing proceeds to step 522 where the method 500 queries whether the breakpoint is an internal safety net entry breakpoint. If not, the breakpoint is either a normal breakpoint or a safety net breakpoint in which case the method 500 proceeds to step 532. If, however, the breakpoint is a safety net entry breakpoint the associated safety net (exit) breakpoint is set at step 524. In some cases, the associated safety net breakpoint may already be set, in which case no action is taken at step 524. Execution is resumed at step 526, after which processing returns to step 504.

Returning to step 520, if a condition is associated with the breakpoint encountered, the method 500 proceeds to step 528 to query whether the condition is true. If not, execution is resumed at step 530, after which the method 500 returns to step 504. If, however, the condition is true, processing proceeds from step 528 to step 532 to query whether a safety net is associated with the breakpoint. Recall that step 532 is also reached from step 522 when step 522 is answered negatively. If step 532 is answered affirmatively then the encountered breakpoint is a normal breakpoint and all safety net breakpoints are removed (or otherwise disabled) at step 534. Processing then proceeds to step 536. Processing also proceeds to step 536 if step 532 is answered negatively. At step 536, the method 500 queries whether the encountered breakpoint is a safety net breakpoint. If not, processing proceeds to step 542. Otherwise, the method 500 queries (at step 538) whether the associated normal breakpoint (also referred to herein as the parent breakpoint) has been disabled. If not, the method 500 proceeds to step 542. If the parent breakpoint has been disabled, the parent breakpoint is re-enabled at step 540, after which processing proceeds to step 542. At step 542, an event is provided to the user interface 124 to display the encountered breakpoint. The method 500 then returns to step 504 to receive the next debug event for processing.

Returning to step 516, if the debug event is not a breakpoint, then processing proceeds to step 544. At step 544, the method 500 queries whether the event is to resume execution. If so, execution is resumed at step 546, after which processing returns to step 504. Alternatively, if step 544 is answered negatively, processing proceeds to step 548 where the method 500 queries whether the event is to remove a breakpoint. If so, the breakpoint and any associated safety net breakpoints are removed at step 550. Processing then returns to step 504. Otherwise, processing proceeds to step 552.

At step 552, the method queries whether the event is a "run to safety net" event. In one embodiment, "run to safety net" is a user selectable feature of the debug program 123 when execution is suspended at a particular normal breakpoint having an associated safety net. Upon selection of this feature, the computer program 120 is allowed to resume execution until encountering the safety net breakpoint. However, prior to resuming execution, the parent breakpoint is first disabled at step 554. This is done to avoid repeatedly encountering the parent breakpoint during continued execution (as may occur in a loop, for example). In addition, the associated safety net is enabled (in the event that the safety net was previously disabled at step 534). Execution is then resumed at step 556, after which processing returns to step 504. If step 552 is answered negatively, processing proceeds to step 558 where any other event may be handled according to the pre-configured rules of the debugger 123.

While the foregoing is directed to embodiments of the present invention, other and further embodiments of the invention may be devised without departing from the basic scope thereof, and the scope thereof is determined by the claims that follow.

What is claimed is:

1. A computer-implemented method of debugging code containing a user-specified breakpoint located within a predetermined region of the code, the method comprising:
   setting a machine recognizable entry point in the code;
   setting a machine recognizable exit point in the code, wherein the entry point and the exit point define an entry and an exit, respectively, of the region;
   executing the code;
   entering the region by encountering the machine recognizable entry point during the execution;
   determining whether the execution of the code exits the region of the code without firing the user-specified breakpoint; exiting the region being determined by encountering the machine recognizable exit point during the execution; and
   if so, halting the execution of the code.

2. The method of claim 1, wherein the user-specified breakpoint is a conditional breakpoint having an associated condition and wherein execution exits the region without firing the user-specified breakpoint because the associated condition is not satisfied.

3. The method of claim 1, further comprising:
   encountering the user-specified breakpoint;
   suspending the execution of the code at the user-specified breakpoint; and
   in response to a user-specified run-to command received while execution of the code is suspended, executing the code until reaching the machine recognizable exit point of the region.

4. The method of claim 1, wherein the user-specified breakpoint is a non-conditional breakpoint and wherein execution exits the region without firing the user-specified breakpoint because the user-specified breakpoint is not encountered.

5. The method of claim 1, wherein:
   setting the machine recognizable entry point in the code comprises setting an internal safety net entry breakpoint in the code; and
   setting a machine recognizable exit point in the code comprises setting a safety net exit breakpoint in the code.

6. The method of claim 5, wherein setting the internal safety net entry breakpoint and setting the safety net exit breakpoint are performed automatically in response to a user selection of the region.

7. The method of claim 5, wherein setting the safety net exit breakpoint is performed automatically in response to encountering the internal safety net entry breakpoint.

8. The method of claim 5, wherein the machine recognizable entry point and the machine recognizable exit point are determined by a compiler.

9. The method of claim 1, wherein halting comprises encountering a safety net breakpoint located in the code relative to the machine recognizable exit point.

10. The method of claim 1, wherein the machine recognizable entry point and the machine recognizable exit point are determined by a compiler.

11. A computer readable medium containing a debug program which, when executed, performs an operation for debugging code containing a user-specified breakpoint located within a predetermined region of the code, the operation comprising:
    defining the region of the code by a machine recognizable entry point and a machine recognizable exit point;
    executing the code;
    entering the region during the execution;
    determining whether the execution of the code exits the region of the code without firing the user-specified breakpoint; exiting the region being determined by encountering the machine recognizable exit point during the execution; and
    if so, halting the execution of the code.

12. The computer readable medium of claim 11, wherein the user-specified breakpoint is a conditional breakpoint having an associated condition and wherein execution exits the region without firing the user-specified breakpoint because the associated condition is not satisfied.

13. The computer readable medium of claim 11, wherein the user-specified breakpoint is a non-conditional breakpoint and wherein execution exits the region without firing the user-specified breakpoint because the user-specified breakpoint is not encountered.

14. The computer readable medium of claim 11, wherein defining the region comprises:
    setting an internal safety net entry breakpoint in the code relative to the machine recognizable entry point of the region; and
    setting a safety net exit breakpoint in the code relative to the machine recognizable exit point of the region.

15. The computer readable medium of claim 14, wherein selling the internal safety net entry breakpoint and setting the safety net exit breakpoint are performed automatically in response to a user selection of the region.

16. The computer readable medium of claim 14, wherein setting the safety net exit breakpoint is performed automatically in response to encountering the internal safety net entry breakpoint.

17. The computer readable medium of claim 14, wherein the machine recognizable entry point and the machine recognizable exit point are determined by a compiler.

18. The computer readable medium of claim 11, wherein halting comprises encountering a safety net breakpoint located in the code relative to the machine recognizable exit point.

19. The computer readable medium of claim 11, wherein the machine recognizable entry point and the machine recognizable exit point are determined by a compiler.

20. A computer system, comprising:
    a memory containing at least a debug program and code containing a user-specified breakpoint located within a predetermined region of the code; and
    a processor which, when executing content of the memory, is configured to perform an operation comprising:
        defining the region of the code by a machine recognizable entry point and a machine recognizable exit point;
        executing the code;
        determining whether the execution of the code exits the region of the code without firing the user-specified breakpoint; and
        if so, halting the execution of the code upon reaching the machine recognizable exit point of the region.

21. The computer system of claim 20, wherein the user-specified breakpoint is a conditional breakpoint having an associated condition and wherein execution exits the region without firing the user-specified breakpoint because the associated condition is not satisfied.

22. The computer system of claim 20, wherein the user-specified breakpoint is a non-conditional breakpoint and wherein execution exits the region without firing the user-specified breakpoint because the user-specified breakpoint is not encountered.

23. The computer system of claim 20, wherein the operation further comprises, prior to determining whether the execution exits the code without firing the user-defined breakpoint:
   setting an internal safety net entry breakpoint in the code relative to all the machine recognizable entry point of the region; and
   setting a safety net exit breakpoint in the code relative to the machine recognizable exit point of the region.

24. The computer system of claim 23, wherein setting the internal safety net entry breakpoint and setting the safety net exit breakpoint are performed automatically in response to a user selection of the region.

25. The computer system of claim 23, wherein setting the safety net exit breakpoint is performed automatically in response to encountering the internal safety net entry breakpoint.

26. The computer system of claim 23, wherein the machine recognizable entry point and the machine recognizable exit point are determined by a compiler.

27. The computer system of claim 20, wherein halting comprises encountering a safety net breakpoint located in the code relative to the machine recognizable exit point.

28. The computer system of claim 20, wherein the machine recognizable entry point and the machine recognizable exit point are determined by a compiler.

* * * * *